(12) United States Patent
Zhu

(10) Patent No.: US 6,761,077 B1
(45) Date of Patent: Jul. 13, 2004

(54) DUAL MAST SYSTEM FOR SIMULATION TESTING

(75) Inventor: Xuegeng Zhu, Toledo, OH (US)

(73) Assignee: Faurecia Exhaust Systems, Inc., Toledo, OH (US)

( * ) Notice: Subject to any disclaimer, the term of this patent is extended or adjusted under 35 U.S.C. 154(b) by 169 days.

(21) Appl. No.: 10/069,233

(22) PCT Filed: Aug. 23, 2000

(86) PCT No.: PCT/US00/20790

§ 371 (c)(1),
(2), (4) Date: Feb. 22, 2002

(87) PCT Pub. No.: WO01/14845

PCT Pub. Date: Mar. 1, 2001

Related U.S. Application Data

(60) Provisional application No. 60/150,532, filed on Aug. 25, 1999.

(51) Int. Cl.[7] .............................................. G11N 17/00
(52) U.S. Cl. ................................................... 73/865.6
(58) Field of Search .............................. 73/117, 117.1, 73/122, 123, 865.6, 865.8, 662, 663, 667–672

(56) References Cited

U.S. PATENT DOCUMENTS

| | | |
|---|---|---|
| 3,459,037 A | 8/1969 | Holzman |
| 3,555,893 A | 1/1971 | Holzman |
| 3,713,330 A | 1/1973 | Lentz |
| 3,827,289 A | 8/1974 | Borg |
| 4,263,809 A | 4/1981 | Petersen et al. |
| 5,111,685 A * | 5/1992 | Langer ......................... 73/117 |
| 5,540,099 A | 7/1996 | Harashima |
| 5,610,330 A | 3/1997 | Fricke et al. |
| 5,877,414 A | 3/1999 | Rui et al. |

FOREIGN PATENT DOCUMENTS

| | | |
|---|---|---|
| EP | 0 877 309 A1 | 11/1998 |
| EP | 0 890 918 A2 | 1/1999 |
| EP | 1 031 827 A1 | 8/2000 |
| SU | 711-411 | 1/1980 |

OTHER PUBLICATIONS

MTS Systems Corporation, 1999, "New Model 324 Fatigue System Provides True Simulation for Exhaust System Testing".

Automotive Engineering International, Feb. 1998, "Life Tests for Automotive Systems" ppg. 141–144.

* cited by examiner

Primary Examiner—Robert Raevis
(74) Attorney, Agent, or Firm—Clark & Brody

(57) ABSTRACT

A simulation testing system and method for testing an automobile system or component(s) such as an exhaust system (14) comprises first and second multi-axis simulation tables. One part of the exhaust system is supported by one of the tables with another part being supported by the other table. Each table includes hydraulic actuators (8) capable of imparting motion to the tables in a number of directions. The tables are independent from each other so that the motion imparted to one table can be distinct and separately controlled from that motion imparted to the other table. By arranging the tables so that the motions can vary between the two tables, more realistic simulation testing can be performed on the system or component being tested.

17 Claims, 2 Drawing Sheets

DUAL MAST SYSTEM FOR SIMULATION TESTING

This application claims the benefit of provisional application Serial No. 60/150,532 filed 25, 1999.

TECHNICAL FIELD

This invention relates to the art of simulation testing. In particular, the invention relates to a rig for simulation testing a full exhaust system for an automobile.

BACKGROUND

Durability testing of automotive parts is commonly used to determine the lifetime of the parts. Such testing has been conducted by placing the part to be tested on a "durability automobile" and running that automobile over a test track under prescribed test conditions for a prescribed period of time. That type of testing, however, requires a significant amount of time due to delays in assembling and scheduling the durability automobile and delays caused by downtime attributed to other parts being tested on the same vehicle.

Simulation testing was developed to reduce the time required for durability testing and thus to reduce the overall time required for new product development, reducing some new product cycles from as much as nine months to as little as one month. Simulation testing involves placing a part to be tested on a "rig," which is designed to replicate the motion of a durability vehicle to subject the part under test to that motion without the problems incident to actual operation of the durability vehicle. This is often accomplished by placing sensors at critical places on the durability vehicle and recording the relative motions at those locations. Then, the test rig is designed to replicate those motions as exactly as possible.

A problem with simulation testing is that of correlation. That is, the results obtained by simulation testing must correlate very well with those obtained by durability vehicle testing for the simulation test to replace the durability vehicle test. Design of a test rig to obtain that correlation has not always been successful.

A prior art rig is that known as a MAST (multi-axis simulation table). A known MAST provides motions about six degrees of freedom, namely the three Cartesian directions and roll, pitch and yaw about respective ones of those axes. The motions are provided in prescribed amounts, such as 3.5–7 G's in the translation directions and 0–50 Hz frequency response on all axes. Generally the system is controlled by a computer, and twelve or more input channels from sensors on the equipment being tested are provided.

The prior MAST rig suffers from the limitation that it is generally a rigid table (e.g., 60 inches by 84 inches) that subjects the entire part being tested to the same motions. In the field of automotive testing, however, applicant has discovered that such a rig can not adequately replicate the motion of an extended part, such as an exhaust system, on a vehicle. Thus, the typical MAST rig does not provide adequate correlation.

Applicant has found that one reason for the lack of correlation provided by the known MAST rig when testing an elongate system, such as an exhaust system, is that the chassis of a vehicle flexes, resulting in motions at one part of the chassis that differs significantly from those at the other end. Moreover, the fundamental frequency of a chassis is generally much lower than for other parts of an automobile.

SUMMARY OF THE INVENTION

In accordance with the invention, applicant has discovered that significantly enhanced correlation can be obtained by mounting the part to be tested on multiple rigs, such as MAST's. In the preferred embodiment, two MAST rigs are used, with one part of the system being tested being mounted on one and the remainder of the system on the other. While the multiple systems can be connected, such as by mounting one MAST on another, applicant's preferred embodiment provides two independent MAST rigs whereby the motion of the part on one MAST is not dependent on the motion of another MAST.

For example, when the system to be tested is an exhaust system, which involves an engine with exhaust manifolds, catalytic converters, mufflers, and associated tubing, the engine and manifolds are mounted on a first MAST and the remainder of the system on a second, uncoupled MAST. This is accomplished in the preferred embodiment by providing two MAST's longitudinally arranged on a floor.

Because each of the MAST's can be programmed separately, the motions applied to the engine and the mufflers can differ and can, therefore, come much closer to replicating the actual motion of the various parts of the durability vehicle.

DETAILED DESCRIPTION OF THE PREFERRED EMBODIMENT

Figure 1:
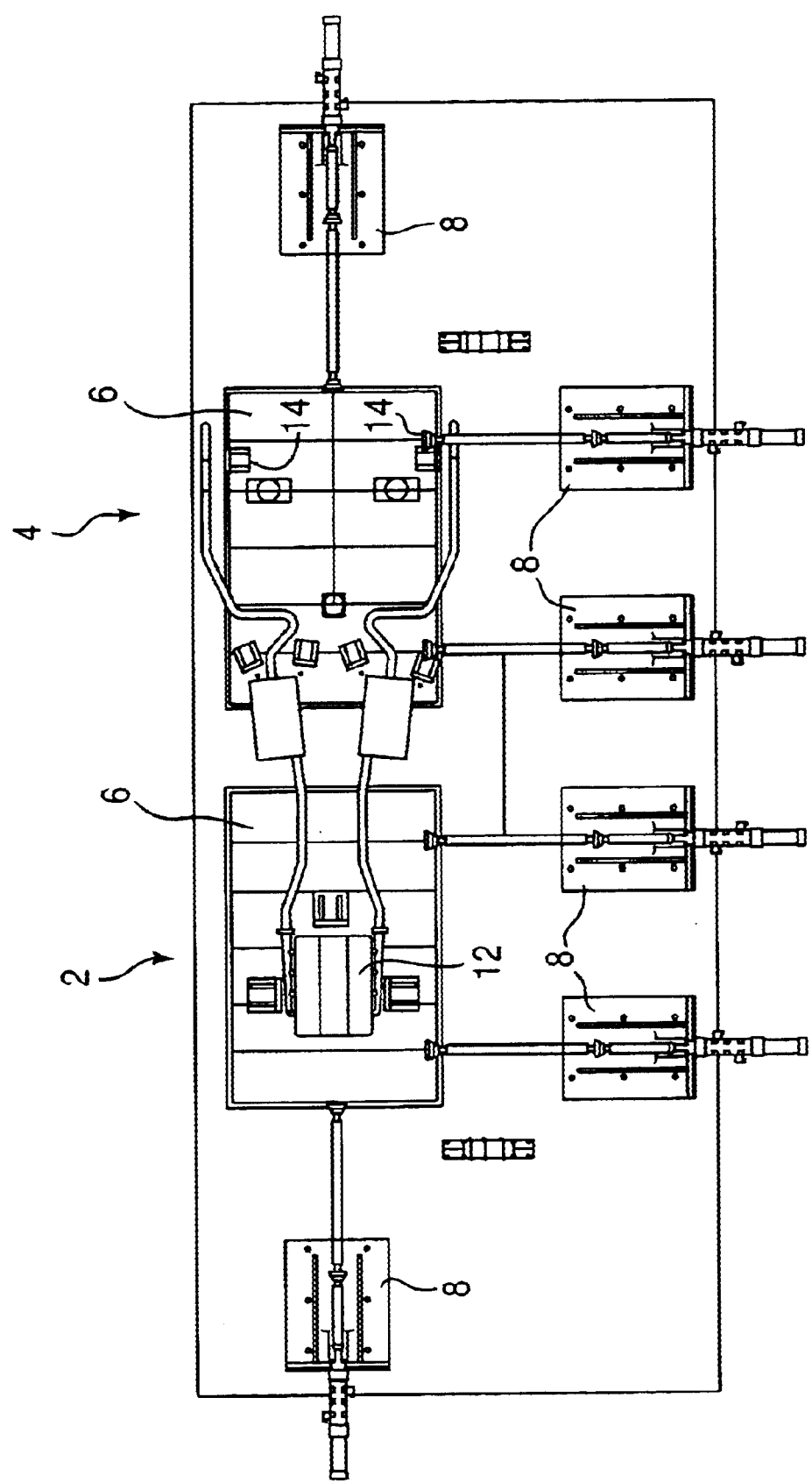
FIG. 1 is a plan view of a dual MAST rig in accordance with the invention.
Figure 2:
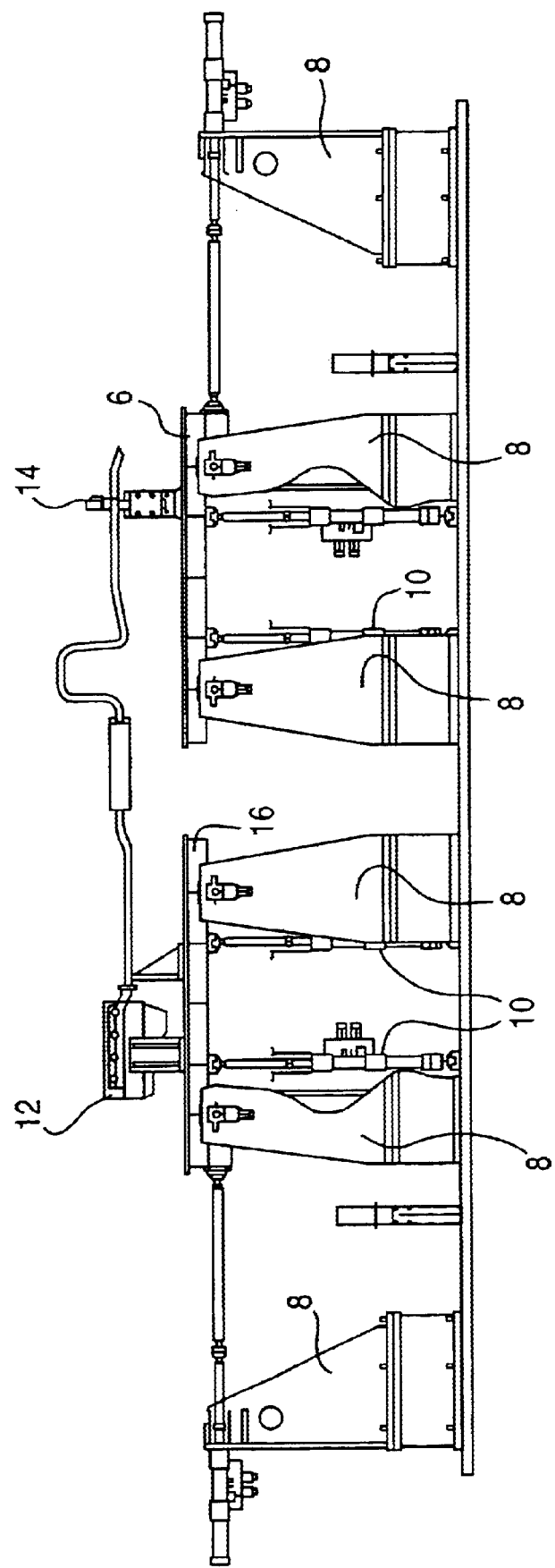
FIG. 2 is a side view of the rig shown in FIG. 1.

With reference to the figures, a multiple-MAST full exhaust system simulation rig in accordance with the invention comprises a first MAST rig 2 and a second MAST rig 4 arranged adjacent each other and mounted on a common floor, such as the concrete floor of a test facility. Each of the MAST rigs 2 and 4 is preferably capable of providing motions about six degrees of freedom. Because the rigs are not coupled, they may be controlled separately to accommodate different motions of the different parts of a vehicle for which the exhaust system is designed.

Each MAST includes a table 6 that is mounted for motion about six degrees of freedom. The tables are generally rigid and are connected to a plurality of computer controlled, hydraulic actuators to provide the required motion. Three of the actuators 8 for each table are mounted for horizontal motion, with two parallel and one perpendicular to the others. At least three actuators 10 are provided beneath each of the tables for generating vertical, and pitch and roll motions.

In the preferred embodiment for use in testing an exhaust system, an engine 12 is mounted on a first of the MAST rigs and the tail pipe hangers 14 are mounted to a second of the MAST rigs. By this arrangement the vehicle motions on the engine are separated from those of the tailpipe, resulting in enhanced correlation.

The MAST rigs shown are those manufactured by MTS Systems of Loveland, Ohio, but the rigs may be of other types. The MAST rigs shown are generally capable of providing motions in the range of 0 to 50 Hz. In a further modification of this arrangement, one of the MAST rigs is replaced with a system that provides motions at higher frequencies, such as that sold under the trademark CUBE, e.g., for mounting the engine.

I claim:

1. A simulation test system comprising a first multi-axis simulation table and a second multi-axis simulation table, wherein the first and second multi-axis simulation tables are arranged to receive separate parts of a system to be tested and wherein each of the first and second multi-axis simulation tables are controlled for movement in each of six degrees of freedom.

2. A simulation test system according to claim 1 wherein said first and second multi-axis simulation tables are uncoupled.

3. The simulation test system of claim 1, wherein each multi-axis simulation table has a plurality of actuators for moving each of the tables, the actuators for one table being independent of the actuators of the other table so that movement imparted by actuators to one table can vary from movement imparted by actuators to the other table.

4. The simulation rest system of claim 3, wherein each of the plurality of actuators is hydraulically driven.

5. The simulation test system of claim 1, wherein a first plurality of actuators are arranged to provide a generally horizontal motion and a second plurality of actuators are arranged to provide a generally vertical motion to each multi-axis simulation table.

6. The simulation test system of claim 5, wherein the first plurality of actuators include two actuators that are aligned to impart a parallel generally horizontal motion, and one actuator positioned impart a generally horizontal motion perpendicular to the parallel motion imparted by the two actuators.

7. The simulation test system of claim 1, further including an exhaust system comprising an engine supported by one of the multi-axis simulation tables, at least one exhaust pipe extending from the engine, and at least one exhaust pipe hanger supported by the other multi-axis simulation table.

8. The simulation test system of claim 7, comprising a pair of exhaust pipes, and a pair of exhaust pipe hangers.

9. A method for simulation testing comprising providing first and second multi-axis simulation tables, mounting a first part of a system to be tested to said first multi-axis simulation table and mounting a second part of said system to be tested on said second multi-axis simulation table, wherein each of the first and second multi-axis is simulation tables are controlled for movement in each of six degrees of freedom.

10. A method according to claim 9, wherein said first and second multi-axis simulation tables are uncoupled.

11. The method of claim 9, comprising subjecting each table to movement through a plurality of actuators for durability testing of the system.

12. The method of claim 11, wherein each actuator is hydraulically driven.

13. The method of claim 9, wherein each table subjected to generally horizontal and generally vertical forces as part of said movement.

14. The method of claim 13, wherein generally horizontal forces are applied in two directions, one direction generally perpendicular to the other direction.

15. The method of claim 14, comprising durability testing an exhaust system by mounting an engine of the exhaust system to one of the tables and at least one exhaust pipe of the exhaust system to the other of the tables.

16. The method of claim 9, comprising durability testing an exhaust system by mounting an engine of the exhaust system to one of the tables and at least one exhaust pipe of the exhaust system to the other of the tables.

17. The method of claim 9, wherein one table is subjected to one set of movements and the other table is subjected to a different set of the movements for the simulation testing.

\* \* \* \* \*